United States Patent [19]
Doran, Jr. et al.

[11] 3,821,133
[45] June 28, 1974

[54] ABRASION-RESISTANT VULCANIZATES

[75] Inventors: Thomas J. Doran, Jr., Norton; Henry C. Stevens, Akron, both of Ohio

[73] Assignee: PPG Industries, Inc., Pittsburgh, Pa.

[22] Filed: Dec. 6, 1971

[21] Appl. No.: 205,295

[52] U.S. Cl............ 260/3, 152/330, 260/3, 260/38, 260/41.5 A, 260/845, 260/846
[51] Int. Cl............ C08d 9/10, C08g 37/16
[58] Field of Search............ 260/3, 845, 846, 38

[56] References Cited
UNITED STATES PATENTS
| | | | |
|---|---|---|---|
| 3,396,065 | 8/1968 | Ney | 260/845 |
| 3,638,702 | 2/1972 | Endter | 260/3 |
| 3,687,719 | 8/1972 | Klotzer | 260/846 |
| 3,692,734 | 9/1972 | Klotzer | 260/846 |

OTHER PUBLICATIONS
Chem. & Eng. News, 4/22/68, pp. 40–41.

*Primary Examiner*—John C. Bleutge
*Attorney, Agent, or Firm*—Irwin M. Stein

[57] ABSTRACT

Abrasion-resistant vulcanizates are provided comprising a rubber, finely-divided reinforcing siliceous pigment, a compound having a plurality of reactive amino groups, an aromatic hydroxy compound, and a methylene donor. Rubber additives are provided comprising a finely-divided siliceous pigment having adsorbed thereon at least one but not more than two of the group selected from a compound having a plurality of reactive amino groups, an aromatic hydroxy compound, and a methylene donor.

8 Claims, No Drawings

ABRASION-RESISTANT VULCANIZATES

This invention relates to the improved abrasion-resistant vulcanizates suitable for use as tire treads and to rubber additives for incorporation in said vulcanizates. More particularly, this invention relates to vulcanizates of a rubber, a finely-divided siliceous pigment, a compound having a plurality of reactive amino groups, an aromatic hydroxy compound, and a methylene donor; and a rubber additive comprising a finely-divided siliceous pigment having adsorbed thereon at least one but not more than two of the group selected from a compound having a plurality amino groups, an aromatic hydroxy compound, and a methylene donor but preferably the amino and hydroxy compounds are not adsorbed on the pigment as some reaction may occur before the methylene donor is added.

The siliceous pigment (alternatively referred to herein as the silica pigment) includes both pyrogenic and precipitated silica of the type heretofore employed for rubber compounding. The siliceous pigment, however, is preferably of the type obtained by the precipitation from a soluble silicate, for example, silica produced according to the method described in U.S. Pat. No. 2,940,830. These pigments have an $SiO_2$ content of at least 50 percent and usually greater than 80 percent by weight on an anhydrous basis. The siliceous pigment should have an ultimate particle size in a range of 50 to 10,000 angstroms, preferably between 50 and 400 and, more preferably, between 100 and 300 angstroms. The BET surface area of the pigment as measured using nitrogen gas is preferably in the range of 40 to 600, usually 50 to 300 square meters per gram. The BET method of measuring surface area is described in the *Journal of the American Chemical Society*, Vol. 60, page 304 (1930). A typical commercial form of such reinforcing siliceous pigment is manufactured and sold by PPG Industries, Inc., under the designation Hi-Sil 233.

The rubber can be of any of the commonly employed types such as, for example, natural, or synthetic rubbers such as silicone, chloroprene, polybutadiene, polyisoprene, EPDM, butadiene, and styrene-butadiene rubbers. For use in tire treads, however, the rubber is preferably of the conventional type such as styrene-butadiene rubber, butadiene rubber, EPDM, and most preferably natural rubber.

The compound having a plurality of reactive amino groups should have at least two and preferably five or more of said groups. They can be both primary and/or secondary amino groups but at least one of said groups should be a primary amino group. Suitable compounds include, for example, polyamines, polyimines, amino acids, poly proteins, amino sugars, deacetylated chitin, gelatin, and similar compounds, to include compounds containing aliphatic, aromatic and both aromatic and aliphatic moieties. The preferred amino compounds are polyethylenimines which are highly branched polyamines composed of units which have two carbons per nitrogen and these units are randomly distributed in the approximate ratios of one primary amino nitrogen/two secondary amino nitrogens and one tertiary amino nitrogen. The aforesaid amino distribution gives rise to what is believed to be a molecule with many branched segments and the tertiary amino nitrogens being the branching site and the primary amino nitrogens being the terminal groups of each segment. Such polyethylenimines are available from Dow Chemical Company or Alcolac Chemical Company in various molecular weight ranges.

In addition to polyethylenimine, other polyamines or polyimines can be employed such as, for example, the polymers derived from propylenimine, 1,2-butylenimine, 2,3-butylenimine, 2-methyl propylenimine; alkylether-substituted imines, such as 3-methoxypropylenimine, 1,3-dibutoxypropylenimine, 1-methyl-1,4-diethoxybutylenimine-2,3,; 1-ethylene gem diether (propylenimine); unsaturated polyalkylene amines such as polyvinylamine, and polyallylamine; polycycloalkylenimines such as prepared by the reduction of polyvinyl pyridine; polyarylenamines, such as polyphenyleneamine and polymethylenepolyphenylamine; polyglycolamines, and copolymers prepared from ethylene oxide and ethylenimine or ethylene sulfide and ethylenimine; and heterocyclic polyamines such as derived from 2-vinyl pyridine, 2-methyl, 5-vinyl pyridine, and copolymers of 2-vinyl and 2-methyl, 5-vinyl pyridines. Exemplary of the preferred amines are those illustrated by U.S. Pat. Nos. 3,335,116 and 3,579,488 (which are incorporated by reference in their entirety) and polyoxyalkylenimines such as polyoxypropylendiimine.

Exemplary of suitable aromatic hydroxy compounds which can be employed include resorcinol, catechol, phloroglucinol, phenol, and low molecular weight resorcinol-formaldehyde resins having free phenolic hydroxyls. The preferred compounds are those having two hydroxyl groups which are meta to each other as the methylene donor reacts more easily with such hydroxy compounds.

The methylene donor is a compound which reacts like formaldehyde upon heating and includes, for example, hexamethylenetetramine, hexamethoxy methyl melamine, paraformaldehyde, Cohedur A produced by Farbenfabriken Bayer and Oxazolidine A, E and T, each manufactured by Commercial Solvent Corporation.

Other conventional ingredients can be incorporated into the rubber compound depending upon its use such as, for example, fibers to include fiberglass, nylon, brass-coated wire, a coloring or reinforcing amount of carbon black as well as the conventional accelerators (e.g., diphenylguanidine) activators (e.g., zinc oxides), curatives (e.g., sulfur), and the like.

The quantities of ingredients will depend upon the uses and particular compounds employed and is not a part of the invention but generally from between about 5 and about 100 parts by weight siliceous pigment per 100 parts of rubber polymer (hereinafter referred to as p.h.r.) is employed and the aromatic hydroxy compound, methylene donor and amino compound will each individually be present within the range from between 0.1 and 15 parts p.h.r. and preferably between about 0.5 and about 8 parts p.h.r.

The compounds can be prepared in the conventional manner as illustrated by the following examples but preferably the methylene donor and curatives are added on the rubber mill to a homogeneous mixture of the other ingredients. Conventional Banbury mixers and rubber mills can be employed.

If desired, one or two of the coupling agent components can be mixed with the siliceous pigment prior to incorporating the pigment into the rubber batch but preferably the amino and hydroxy compound are not both adsorbed on the silica. The adsorption can be accomplished such as by mixing at a temperature between about 0° and about 80° C. in a solvent such as water, benzene, xylene, or other suitable nonreactive solvent for the coupling agent for between about 1 and 120 minutes until the coupling agent component(s) is adsorbed on the siliceous pigment. In this manner, the coupling agents which are often highly viscous, high melting, or difficultly dispersible materials can be more rapidly incorporated into the rubber batch and any tendency of the rubber to become overheated or scorched, obviated or minimized.

The following examples will serve to illustrate the invention and its preferred embodiments. All parts and percentages in said examples and elsewhere in this specification are by weight (unless otherwise indicated).

EXAMPLE I

Into a 1 liter round-bottomed 3-necked flask equipped with a mechanical stirrer was placed 100 grams of precipitated silica (Hi-Sil 233 manufactured by PPG Industries, Inc.) and 600 milliliters of benzene. A Dean-Stark azeotropic distillation trap was mounted on the flask and the mixture heated until about 3 milliliters of water was distilled off. The mixture was allowed to cool to room temperature and then a solution of 5 grams of polyethylenimine (Dow Chemical PEI 12, 1,200 average molecular weight) in 100 milliliters of benzene was added dropwise with stirring. The mixture was stirred for 1 hour and the treated pigment was isolated by filtration and dried to constant weight by heating in a vacuum oven at a pressure of 20–50 millimeters mercury and a temperature of 50°–65° C. for 24 hours.

The following rubber compounds were compared by mixing the ingredients shown in Table 1 (other than the ingredients marked by an asterisk which were added to the rubber mix on an open rubber mill) in a Banbury for about 5 minutes at a temperature of between 300° and 320° F. Stress-strain sheets and Pico abrasion buttons were prepared from these compounds and physical properties were measured on these samples. The data is tabulated in Table 2.

The compounds in Examples 5 through 10 were prepared by adding the rubber to a Brabender maintained at a temperature of about 165° C. and thereafter adding with mastication: polyethylenimine 1 minute after the rubber; resorcinol, 1 minute thereafter, and Hi-Sil 233 and phenyl-beta-napthylamine 1 minute thereafter; and the mixture masticated for an additional 3 minutes to obtain a homogeneous mixture. With the compounds in which zinc oxide was incorporated in the Brabender, the zinc oxide was added to the rubber after 3 minutes of mastication and the Hi-Sil added 1 minute thereafter. The homogeneous mixture was then put on an open rubber mill at a temperature of about 100° F. wherein the hexamethylenetetramine was added followed by the other ingredients marked by the asterisk.

TABLE 1

| Compound Ingredients | Compound (Parts by Weight) | | | | | | | | | |
|---|---|---|---|---|---|---|---|---|---|---|
| | 1 | 2 | 3 | 4 | 5 | 6 | 7 | 8 | 9 | 10 |
| Styrene-butadiene rubber | 100 | 100 | 100 | 100 | — | — | — | — | — | — |
| Natural rubber | — | — | — | — | 100 | 100 | 100 | 100 | 100 | 100 |
| Hi-Sil 233[1] | 60 | 60 | 60 | 60 | 60 | 60 | 60 | 60 | 60 | 60 |
| Composition of Example I | 63 | 63 | 63 | 63 | — | — | — | — | — | — |
| Phenylbeta-napthylamine | 1 | 1 | 1 | 1 | 1 | 1 | 1 | 1 | 1 | 1 |
| Resorcinol | 2.5 | 2.5 | 2.5 | 2.5 | 1.1 | 2.2 | 3.3 | 3.3 | 2.2 | — |
| PEI-12[2] | — | — | — | — | 0.9 | 0.9 | 0.9 | 1.8 | 0.9 | — |
| Hexamethylenetetramine | — | — | 1.6 | 1.4* | 2.8* | 4.2* | 4.2* | 2.8* | — | — |
| Resotropin[3] | — | — | — | — | — | — | — | — | — | — |
| Paraformaldehyde | 3.3 | — | — | — | — | — | — | — | — | — |
| Oxazolidine T[4] | — | 3.2 | 4.8 | — | — | — | — | — | — | — |
| Sulfur* | 2.5 | — | — | — | 2.5 | 2.5 | 2.5 | 2.5 | 2.5 | 2.5 |
| Santocure NS[5] | — | — | — | — | 1 | 1 | 1 | 1 | 1 | 1 |
| Diphenylguanidine* | — | — | — | — | 1 | 1 | 1 | 1 | 1 | 1 |
| Zinc oxide | 4* | 4* | 4* | 4* | 4 | 4 | 4 | 4 | 4* | 4 |
| 2,2'-Dithiobis(benzothiazole) | .75 | .75 | .75 | — | — | — | — | — | — | — |
| Di-ortho-tolylguanidine* | 1.5 | 1.5 | 1.5 | — | — | — | — | — | — | — |
| Tetramethylthiuram disulfide* | .25 | .25 | .25 | .25 | — | — | — | — | — | — |

[1]Precipitated silica manufactured by PPG Industries, Inc.
[2]Polyethylenimine 1200 MW., manufactured by Dow Chemical Co.
[3]Equimolar addition compound of resorcinol and hexamethylenetetramine.
[4]Methylene donor manufactured by Commercial Solvents Corporation.
[5]N-cyclohexy-2-benzothiazole sulfenamide manufactured by Monsanto Company.

The rubber compounds in Table 1 were then subjected to various physical tests and the results are reported in the following Table 2:

TABLE 2

| (Min.) | 90% Cure 300°F. (psi) | 300% Modulus (psi)[1] | Tensile (psi)[1] | Elongation (%) | Hardness (Shore A)[2] | Pico Abrasion (Index)[3] |
|---|---|---|---|---|---|---|
| 1 | 47 | 1900 | 2690 | 390 | 88 | 101 |
| 2 | 40 | — | 2290 | 280 | 92 | 121 |
| 3 | 45 | 2140 | 2430 | 330 | 91 | 104 |
| 4 | 37.5 | 2250 | 2600 | 330 | 90 | 119 |
| 5 | 19 | 1870 | 4500 | 530 | 78 | 101 |
| 6 | 17 | 2190 | 4100 | 500 | 84 | 111 |
| 7 | 14 | 2530 | 4300 | 450 | 86 | 135 |

TABLE 2—Continued

| (Min.) | 90% Cure 300°F. (psi) | 300% Modulus (psi)[1] | Tensile (psi)[1] | Elongation (%) | Hardness (Shore A)[2] | Pico Abrasion (Index)[3] |
|---|---|---|---|---|---|---|
| 8 | 13 | 2810 | 4470 | 440 | 87 | 125 |
| 9 | 17 | 2560 | 4630 | 480 | 85 | 116 |
| 10 | 28 | 1150 | 3070 | 530 | 78 | 81 |

[1]Tested according to ASTM D-412-49 T.
[2]Tested according to ASTM D-314.
[3]Tested according to ASTM D-2228-63T.

From the data reported in Table 2, it can be seen that a conventional rubber compound, additionally formed from polyimine, an aromatic hydroxy compound, silica and preferably a methylene donor have desirable physical properties such as improved tensile strength, shortened cure time, increased 300 percent modulus, and are particularly resistant to abrasion as evidenced by the Pico Abrasion Index indicating their suitability for use as tire treads, hose, belting, and mechanical rubber goods. While the data indicate the compounds to be effective in both natural rubber and styrene butadiene rubber, the natural rubber compounds are unusually effective.

The procedure employed for compounds 1 through 4 in which the silica is treated with the polyimine is preferred for the reason that a difficulty dispersible mass can result when all of the ingredients are reacted simultaneously before a homogeneous mixture can be obtained. Thus, it is preferred that the polyimine be reacted with the silica prior to incorporation into the rubber batch or that the phenolic compound be blended with the silica or with the polyamine treated silica. Of the aforesaid ingredients, the methylene donor is preferably added last on the rubber mill.

While there are above described a number of specific embodiments of the present invention, it is obviously possible to produce other embodiments in various equivalent modifications thereof without departing from the spirit of the invention.

Having set forth the general nature and specific embodiments of the present invention, what is claimed is particularly pointed out in the appended claims.

We claim:

1. An abrasion-resistant vulcanizate of siliceous pigment reinforced rubber selected from natural rubber, silicone rubber, chloroprene rubber, polybutadiene rubber, polyisoprene rubber, EPDM rubber or styrene-butadiene rubber, from about 0.1 to about 15 parts, per 100 parts by weight of the rubber, each of (a) polyamine or polyimine compound selected from polymers of ethylenimine, propylenimine, 1,2-butylenimine, 2,3-butylenimine, 2-methyl propylenimine alkyloxyalkylenimine, unsaturated polyalkylene amines and cycloalkylenimines, said polymers having a plurality of reactive amino groups at least one of which reactive amino groups is a primary amino group, (b) aromatic hydroxy compound selected from resorcinol, catechol, phloroglucinol, phenol, and low molecular weight resorcinol-formaldehyde resins having free phenolic hydroxyls, and (c) a methylene donor compound selected from hexamethylenetetramine, hexamethoxymethyl melamine and paraformaldehyde.

2. The vulcanizate of claim 1 wherein the siliceous pigment is precipitated silica.

3. The vulcanizate of claim 1 wherein the compound having reactive amino groups is polyethylenimine.

4. The vulcanizate of claim 1 wherein the compound containing reactive amino groups, the methylene donor, and aromatic hydroxy compound are individually present in an amount from between about 1 and about 8 parts per 100 parts by weight of the rubber.

5. The vulcanizate of claim 1 wherein the siliceous pigment is present in amounts of between about 5 and about 100 parts per 100 parts by weight of rubber and the aromatic hydroxy compound, methylene donor compound and compound containing reactive amino groups are each individually present between about 0.5 and about 8 parts per 100 parts by weight of rubber.

6. An abrasion-resistant vulcanizate of rubber selected from styrene-butadiene rubber, butadiene rubber, EPDM rubber, and natural rubber, precipitated siliceous pigment, polyethylenimine having at least five reactive amino groups, at least one of which amino groups is a primary amino group, resorcinol, and hexamethylenetetramine, wherein the siliceous pigment is present in an amount between about 5 to about 100 parts and the polyethylene imine, resorcinol and hexamethylenetetramine are each individually present in an amount between about 0.5 and about 8 parts per hundred parts by weight of rubber.

7. The vulcanizate of claim 6 wherein the rubber is natural rubber.

8. The vulcanizate of claim 3 wherein the polyethylenimine has at least five reactive amino groups.

* * * * *